(12) United States Patent
Jia et al.

(10) Patent No.: US 10,057,186 B2
(45) Date of Patent: Aug. 21, 2018

(54) SERVICE BROKER FOR COMPUTATIONAL OFFLOADING AND IMPROVED RESOURCE UTILIZATION

(71) Applicant: International Business Machines Corporation, Armonk, NY (US)

(72) Inventors: Bin Jia, Eastleigh (GB); Ying Liu, Beijing (CN); E Feng Lu, Beijing (CN); Yan Rong Shen, Beijing (CN); Jia Wu, Beijing (CN); Zhen Zhang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 539 days.

(21) Appl. No.: 14/593,291

(22) Filed: Jan. 9, 2015

(65) Prior Publication Data

US 2016/0205202 A1  Jul. 14, 2016

(51) Int. Cl.
| G06F 15/173 | (2006.01) |
| H04L 12/911 | (2013.01) |
| G06Q 30/04  | (2012.01) |
| G06Q 20/14  | (2012.01) |
| H04L 29/08  | (2006.01) |

(52) U.S. Cl.
CPC ......... H04L 47/783 (2013.01); G06Q 20/145 (2013.01); G06Q 30/04 (2013.01); H04L 67/10 (2013.01); H04L 67/16 (2013.01); H04L 67/20 (2013.01); H04L 67/2861 (2013.01)

(58) Field of Classification Search
CPC .................................. H04L 29/06; G06F 7/04

USPC ............................................... 726/4; 709/226
See application file for complete search history.

(56) References Cited

U.S. PATENT DOCUMENTS

| 8,392,567 B2 | 3/2013 | Arwe et al. |
| 8,489,465 B2 | 7/2013 | Chang et al. |
| 8,538,788 B1 | 9/2013 | Spiegel et al. |
| 8,745,242 B2 | 6/2014 | Dawson et al. |
| 2011/0137805 A1* | 6/2011 | Brookbanks .......... G06F 9/5072 705/80 |
| 2011/0138034 A1* | 6/2011 | Brookbanks ........ H04L 41/5009 709/224 |

(Continued)

FOREIGN PATENT DOCUMENTS

WO    2012022585 A1    2/2012

OTHER PUBLICATIONS

Appendix P—List of IBM Patents or Patent Application Treated as Related.

(Continued)

Primary Examiner — Oluseye Iwarere
(74) Attorney, Agent, or Firm — David B. Woycechowsky

(57) ABSTRACT

Flexible utilization of capacity to provide computing services mediated by a service broker. The service broker receives a request from a first party for assistance with a service workload as well as an indication from a second party of a willingness to provide service. The service broker matches the parties with each other based at least in part on the capacity of the second party to service the service workload of the first party, manages offloading of the service workload from first party to the second party, and manages billing of a workload provider (such as the first party or the first party's customer) for the offloading engagement.

14 Claims, 9 Drawing Sheets

(56) References Cited

U.S. PATENT DOCUMENTS

| | | | | |
|---|---|---|---|---|
| 2011/0138048 | A1* | 6/2011 | Dawson | G06F 9/4856 709/226 |
| 2011/0251937 | A1* | 10/2011 | Falk | G06F 21/10 705/34 |
| 2012/0079493 | A1* | 3/2012 | Friedlander | G06F 9/5027 718/104 |
| 2012/0117626 | A1* | 5/2012 | Yates | H04L 63/101 726/4 |
| 2012/0204169 | A1* | 8/2012 | Breiter | G06F 9/5072 717/171 |
| 2012/0222084 | A1* | 8/2012 | Beaty | H04L 43/0817 726/1 |
| 2012/0317648 | A1* | 12/2012 | Brown | G06F 8/60 726/26 |
| 2013/0185413 | A1* | 7/2013 | Beaty | G06F 9/5072 709/224 |
| 2013/0332611 | A1* | 12/2013 | Beaty | G06F 17/30312 709/226 |
| 2014/0075013 | A1* | 3/2014 | Agrawal | G06F 11/3495 709/224 |
| 2014/0136689 | A1* | 5/2014 | Beaty | H04L 67/1097 709/224 |
| 2014/0195721 | A1* | 7/2014 | Abali | G06F 12/16 711/103 |
| 2014/0237550 | A1 | 8/2014 | Anderson et al. | |
| 2015/0365291 | A1* | 12/2015 | Burton | H04L 41/0893 709/226 |
| 2016/0112339 | A1* | 4/2016 | Cheemalapati | H04L 47/70 709/226 |
| 2016/0191342 | A1* | 6/2016 | Kannan | H04L 41/5025 709/226 |
| 2016/0196166 | A1* | 7/2016 | George | G06F 9/5077 718/1 |

OTHER PUBLICATIONS

U.S. Appl. No. 14/837,005 entitled "Service Broker for Computational Offloading and Improved Resource Utilization", filed Aug. 27, 2015.

Foster et al., "The Physiology of the Grid An Open Grid Services Architecture for Distributed Systems Integration", This is a Draft document and a work in progress. Version: Jun. 22, 2002, pp. 1-31.

IBM, "Using the WebSphere DataPower Option for Application Optimization to demonstrate self-balancing across multiple DataPower appliances and intelligent load distribution to backend servers", Jul. 11, 2012, <http://www.ibm.com/developerworks/websphere/tutorials/1207_mohith/.

"Berkeley Open Infrastructure for Network Computing", Wikipedia, the free encyclopedia, page last modified on Dec. 13, 2014 at 20:42.

"Workload Management for Service Brokers in a Grid", IP.com Prior Art Database Disclosure, IP.com Disclosure No. IPCOM000028510D, Publication Date: May 18, 2004, pp. 1-2.

* cited by examiner

US 10,057,186 B2

SERVICE BROKER FOR COMPUTATIONAL OFFLOADING AND IMPROVED RESOURCE UTILIZATION

BACKGROUND OF THE INVENTION

The present invention relates generally to the field of computational outsourcing, and more particularly to management of dynamic resource provisioning.

Cloud computing, which is a model of service delivery for enabling convenient, on-demand network access to a shared pool of configurable computing resources, is known and is described in further detail in the Detailed Description section of this Specification. Grid computing, in which a large task is divided into pieces and each piece is apportioned among many geographically dispersed, loosely coupled, networked computers which act in coordination to complete the task, is also known.

SUMMARY

According to an aspect of the present invention, there is a method, computer program product and/or system that performs the following steps (not necessarily in the following order): (i) receives, from a service delegatee, an indication of ability to provide service; (ii) receives, from a service delegator, a request for assistance with a service workload; (iii) matches the service delegatee with the service delegator based, at least in part, on a capacity of the service delegatee to service the service workload of the service delegator; (iv) manages offloading of the service workload from the delegator to the delegatee, including initialization and termination of a service offloading engagement; and (v) manages billing of a workload provider for the service offloading engagement.

DETAILED DESCRIPTION

Figure 1:
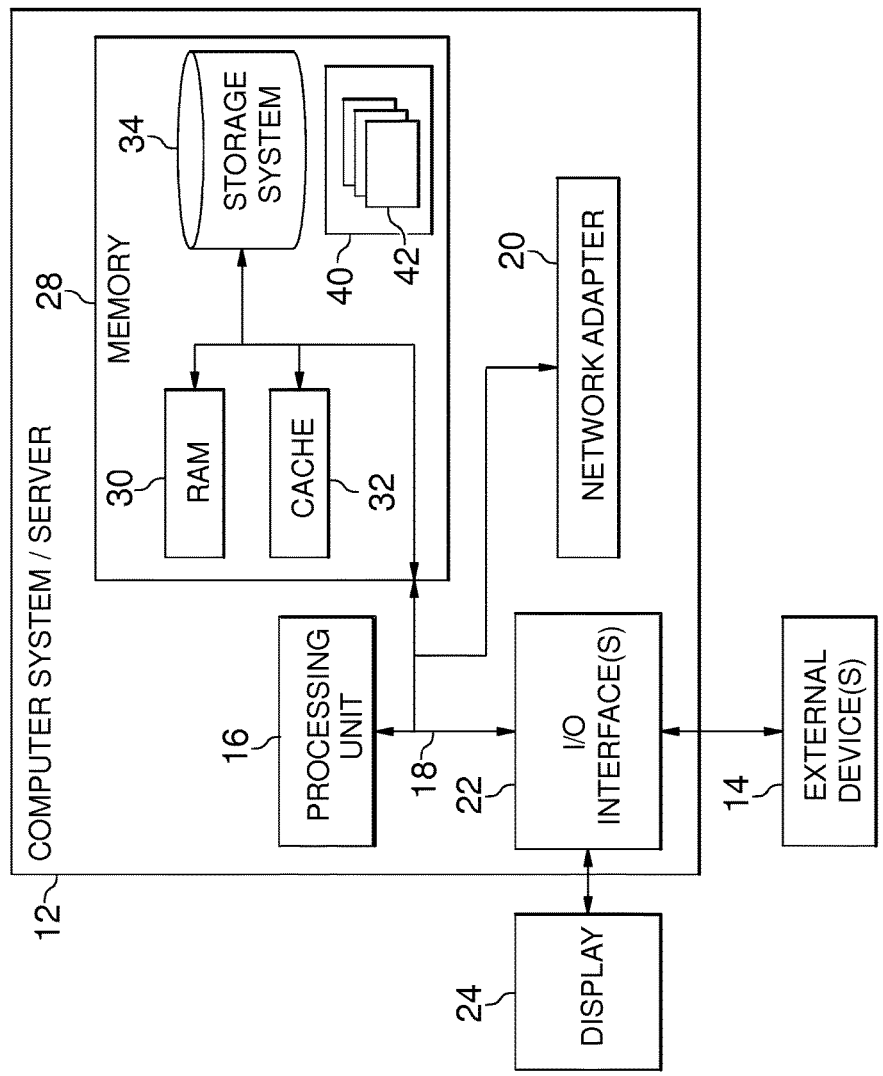
FIG. 1 depicts a cloud computing node used in a first embodiment of a system according to the present invention.

Some embodiments of the present invention include a service broker that facilitates offloading of computing services from a primary provider to a secondary provider. Primary providers announce to the registry when they are in need of assistance, and secondary providers announce to the registry when they have spare capacity to offer. Either provider may specify the criteria their counterpart should meet in order for an offloading engagement to be established between them, as well as when they wish to terminate an engagement, permitting participants a high degree of control over the engagements in which they participate. The service registry broker matches primary and secondary providers, and may handle software deployment for enabling the engagement, engagement monitoring and management, and/or engagement billing and payment management. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flow chart illustrations and/or block diagrams of methods, apparatus (systems), and computer program products according to embodiments of the invention. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the Figures illustrate the architecture, functionality, and operation of possible implementations of systems, methods, and computer program products according to various embodiments of the present invention. In this regard, each block in the flow chart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
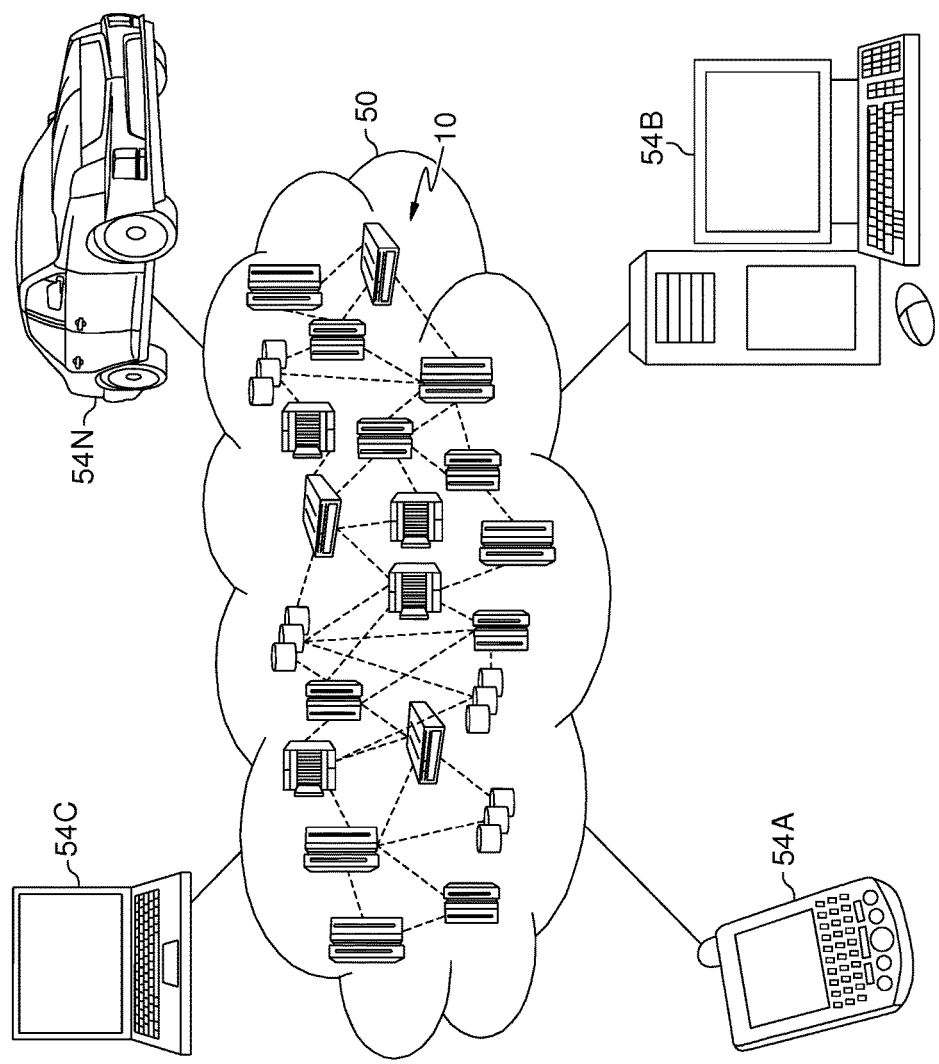
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
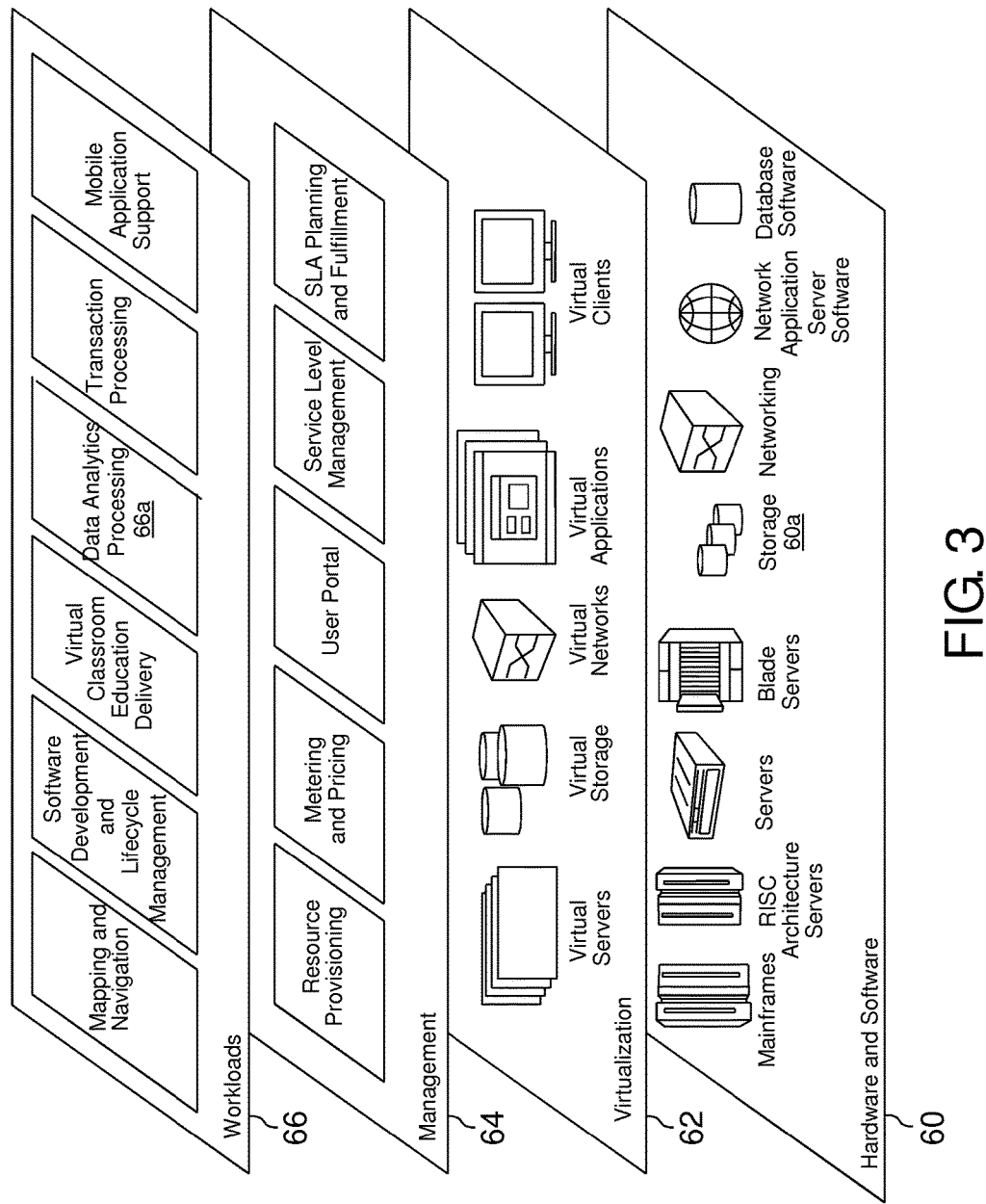
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing 66a; transaction processing; and mobile application support.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. EXAMPLE EMBODIMENT

Figure 4:
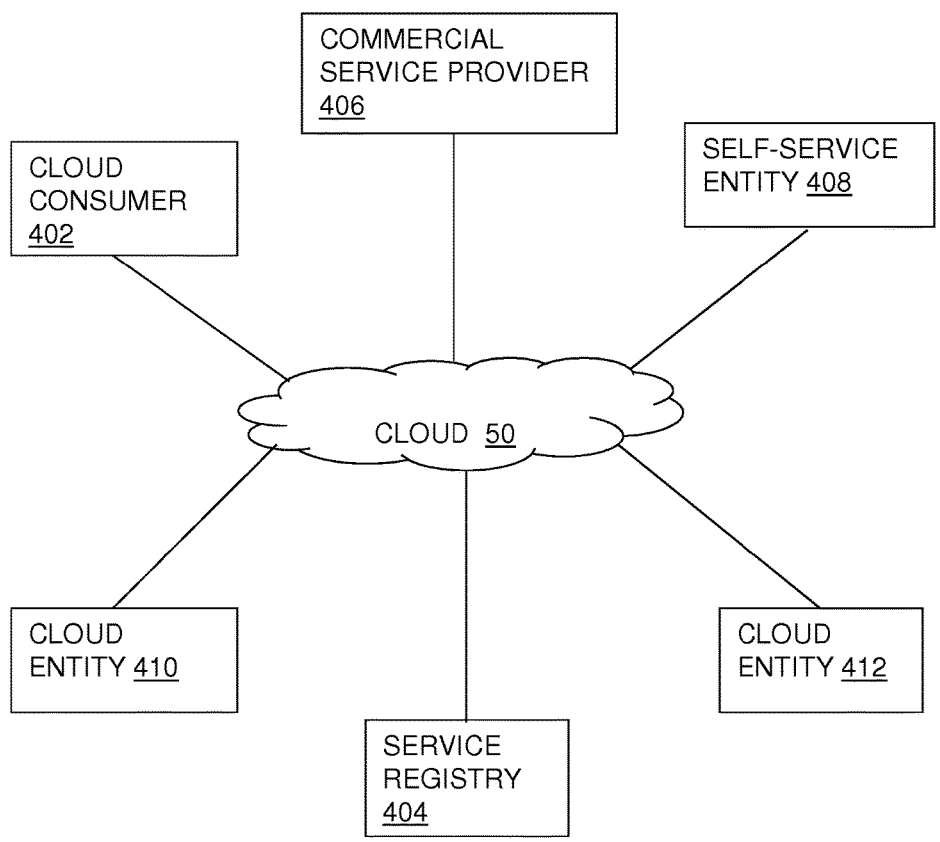
FIG. 4 depicts certain components of the cloud computing environment of the first embodiment system.

Shown in FIG. 4 is a portion of the cloud computing environment depicted in FIG. 2. FIG. 4 shows an administrative abstraction layer of cloud 50, and includes: cloud services consumer 402, service registry 404; commercial service provider 406; self-service entity 408; and cloud entities 410 and 412. At the beginning of the process described in the following paragraphs, cloud consumer 402 is using cloud services provided by commercial cloud services provider 406. It will be apparent to one of ordinary skill in the art that various functions described below as part of a certain step may alternatively be done in a different step, and/or that certain steps may be done in a different order.

Figure 5:
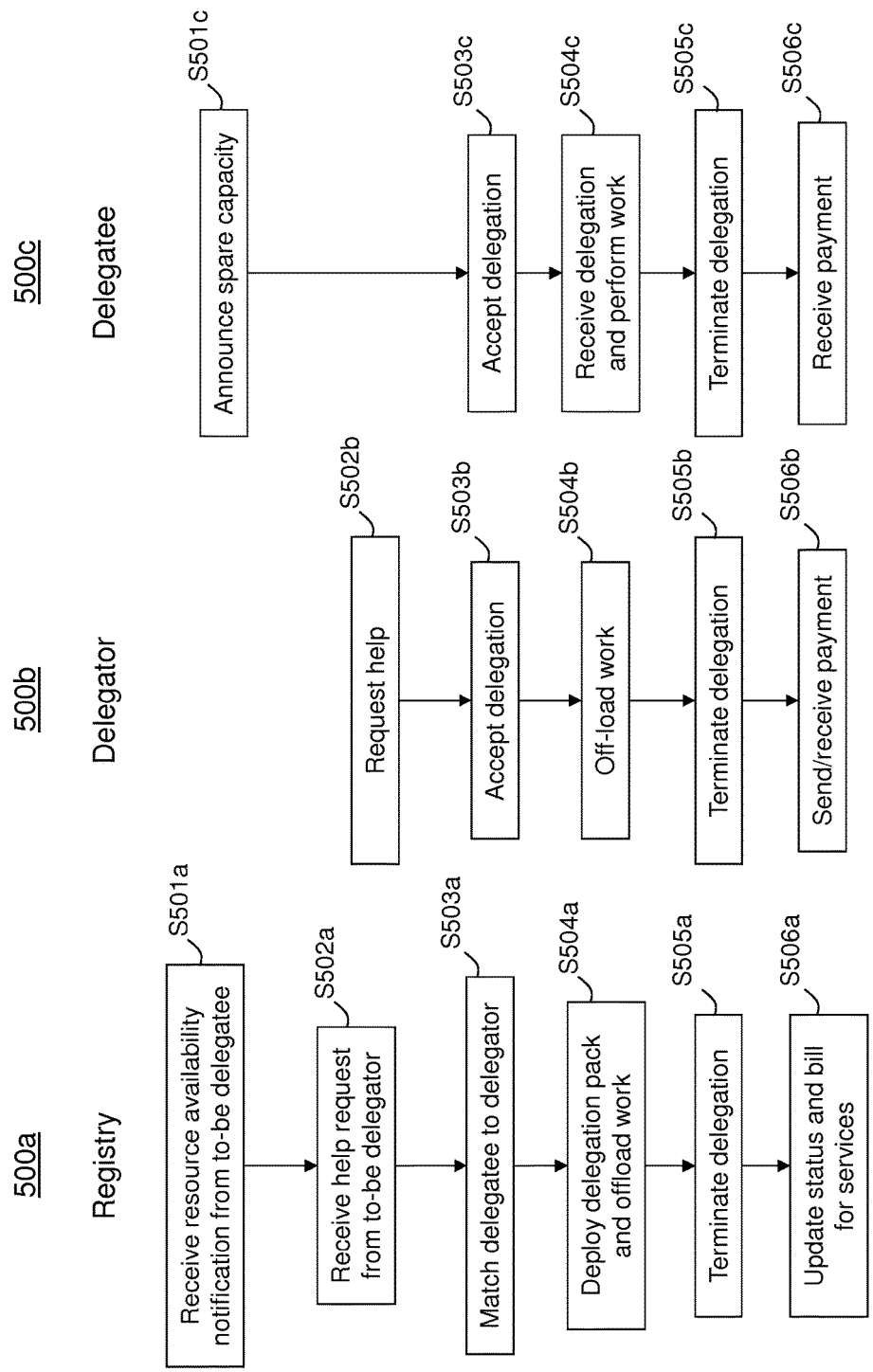
FIG. 5 is a set of flowcharts showing a first, second, and third embodiment method performed, at least in part, by the first embodiment system.
Figure 6:
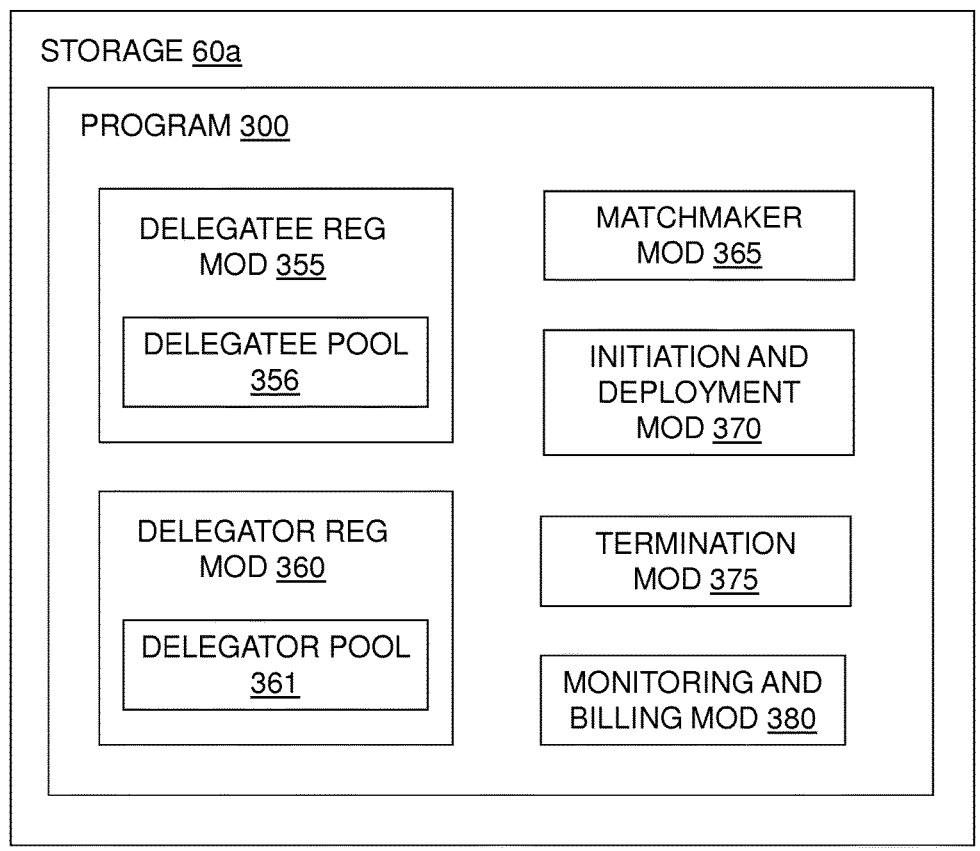
FIG. 6 is a block diagram showing a machine logic (for example, software) portion of the first embodiment system.

FIG. 5 shows flowcharts 500a, 500b, and 500c, each depicting a method according to the present invention. Flowchart 500a pertains to steps carried out by service registry 404, and FIG. 6 shows program 300 for performing at least some of the method steps of this flowchart. This method and associated software will now be discussed, over the course of the following paragraphs, with extensive reference to FIG. 4 (for the administrative actors), FIG. 5 (for the method step blocks) and FIG. 6 (for the software blocks). One physical location where program 300 of FIG. 6 may be stored is in storage block 60a (see FIG. 3). The methods of flowcharts 500b and 500c, pertaining to steps carried out by commercial service provider 406 (the "delegator") and self-service entity (SSE) 408 (the "delegatee"), respectively, will be described in parallel.

Processing begins at step S501a, where delegatee registration module ("mod") 355 registers an announcement of spare service capacity from SSE 408, storing the announcement information in delegatee pool 356. SSE 408 makes this announcement in step S501c, in response to an internal determination that it has spare capacity. In this case, its spare capacity results from the end of a daily cycle of internal batch processing, allowing it to announce with high confidence that its space capacity will be available for the next twelve hours, until commencement of the next cycle of daily batch processing begins. In some embodiments, service registry 404 may automatically detect spare capacity of registry participants, or may, such as in the batch processing example above, assume cyclic spare capacity from SSE 408, for instance based on historic data, unless it receives a message from SSE 408 to the contrary. In general, delegatees need not be principally self-serving entities but may be nearly any type of device belonging to nearly any type of entity—desktops computers of large organizations, mainframes of commercial service providers, mobile devices such as smartphones or embedded automobile computers of private individuals, and so on—as long as they qualify based on whatever criteria the service registry may require. Often, delegatee resources will be those generally used for internal and/or non-commercial purposes rather than those principally provisioned for servicing customer workloads.

The capacity message in this case provides information about storage, processing, and operating system resources at the physical layer (layer 60 of FIG. 3) that SSE 408 is willing to rent out for use, but in general resource availability from any layer or from multiple layers may be reported. The capacity message may also provide constraint, preference, and/or guarantee information, such as "resources are only available for use by service provider 406 or entity 410, may only be used for processing data not subject to United States export regulations, and once bound are guaranteed for a minimum of 4.5 hours." In some embodiments, default information for a delegatee may be provided during a general registration process apart from the capacity announcement message. Typically, delegatee pool 356 is dynamic in that capacity announcement messages may be expired, updated, or superseded over time as dictated by evolving circumstances of the various delegatee registrants. The ability to provide detailed availability, constraint, and/or preference information gives delegatees a high level of control over the delegators they choose to work with and the work they choose to accept.

Processing proceeds to step S502a, where delegator registration mod 360 registers a request for assistance by service provider 406, storing the request information in delegator pool 361. Service provider 406 makes this request in step S502b, in response to an internal determination that it requires help. In this case, service provider 406 is experiencing an unexpected drain on its processing capacity due to unscheduled maintenance on a bank of its physical servers combined with service consumer 402 drawing an unusual amount of resources to initially populate a data store cataloging Internet videos based on keywords extracted from their audio component. This step and its variations are largely similar to those of the previous step and thus will not be described again here. Delegators need not be independent service providers providing service for other parties but may also be, for example, self-service entities with a need to offload a portion of their own work.

Processing proceeds to step S503a, where matchmaker mod 365 makes timely matches of delegators needing assistance to delegatees with available resources. All manner of criteria may be used to find a best match, including factors such as trust relationship between the parties, capacity type and expected duration, geographic domain or proximity, reliability history, price, and so forth. In some embodiments of the present invention, capacity type of delegatees beyond the most fundamental layer(s) is of marginal importance because the service registry will deploy any necessary software support, as further detailed below. Here, matchmaker mod 365 matches service provider 406 with SSE 408 based on an existing trust relationship between the parties and compatible expectations of service duration. Service registry 404 reports this match to both parties, who respectively accept it in steps S503b and S503c. Alternatively, one or both parties reject the delegation and matchmaker mod 365 tries again with a different match. In some embodiments, the delegation is automatic, without an explicit post-match acceptance required by the parties. In some embodiments, one or the other party or both may be provided with a list of delegates (delegators or delegatees, as appropriate) to choose from. In some embodiments, a commitment to service-level agreement (SLA) guarantees may be part of this step.

Processing proceeds to step S504a, where initialization and deployment mod 370 establishes the conditions required for SSE 408 to begin processing some of service provider 406's work. In this case, the work to be offloaded is all of consumer 402's application programming interface (API) requests for the "GetKeywordsFromAV" API, a service that, given a properly formed uniform resource identifier (URI), extracts and returns a list of keywords and phrases from the audio component of the targeted audio/video content stored in a commonly known format. In general, the work to be offloaded may be broken down in many other ways, such as all work directed to service provider 406's GetKeywordsFromAV API from any consumer, or a percentage of the GetKeywordsFromAV requests from consumer 402. Depending on the nature of the work and the specifics of the implementation, the work may be forwarded from service provider 406 or may pass directly from consumer 402 to SSE 408 via, for example, a transparent binding.

To support the workload offloading, service registry 404 deploys a service pack to SSE 408 that contains the software necessary for SSE 408 to provide the GetKeywordsFromAV API service. This may include software components at one or more layers of the model shown in FIG. 3, and the specifics may vary depending on the native capabilities of the chosen delegatee. It is noted that such deployments, when made, should be verified to comply with all license or use restrictions pertaining to the deployed software. In at least some embodiments, the service pack is provided by the delegator based on the service(s) the delegator wishes to offload. Allowing the delegator to provide the enabling software may significantly increase the pool of potentially compatible delegatees. The delegator and delegatee components of this step are shown in steps S504b and S504c. Once the offloading arrangement has been set up, SSE 408 can begin processing work for service provider 406.

Processing proceeds to step S505a, where termination mod 375 ends the offloading delegation upon the occurrence of some specified event. In this case, service provider 406 has brought its server cluster back online after 6 hours and can again handle its full workload, including the workload placed upon it by consumer 402's prodigious use of the GetKeywordsFromAV API. Alternatively, the delegation might end upon request for termination by SSE 408, after a fixed period of time has elapsed, when a certain level of expense has accrued, and so on. Service registry 404 mediates the graceful retirement of SSE 408 as needed, such as by removing the software deployed upon initialization of the offloading engagement. The delegator and delegatee components of this step are reflected in steps S505b and S505c.

Processing proceeds to step S506a, where monitoring and billing mod 380 provides billing and payment mediation services for service delegation participants. It also monitors utilization and performance of SSE 408 with respect to its offloading engagement with service provider 406 and accepts feedback from each participant about the experience, which it may use when matching offloading counterparties in the future. Here billing is transparent to the consumer in that consumer 402 pays service provider 406 as usual, while service registry 404 mediates billing between service provider 406 and SSE 408. Alternatively, the participants may agree on another billing arrangement, such as having service registry 408 bill consumer 402 on behalf of each of provider 406 and SSE 408 for only the portion of the service each actually provides. The delegator and delegatee components of this step are reflected in steps S506b and S506c. A service registry that provides offloading process management as well as integrated services such as trust verification, billing, performance credit worthiness, and so forth leaves a low implementation burden on would-be participants in the service outsourcing scheme.

The above-described functionality enables entities to fluidly initiate and terminate engagements over short periods, enjoy a high degree of control over delegate counterparties, and/or base delegating decisions on dynamically evolving circumstances. It also allows participating entities to obtain high resource utilization rates and to earn a return on otherwise idle resources, and minimizes the implementation burden necessary for entities to enter the system. Such benefits may be particularly valuable in the case of individuals or self-serving entities that would not otherwise participate as service providers in the cloud or other networked computing environments.

III. FURTHER COMMENTS AND/OR EMBODIMENTS

Some embodiments of the present invention recognize the following facts, potential problems and/or potential areas for improvement with respect to the current state of the art: (i) the utilization of information technology (IT) systems is a costly problem for many organizations; (ii) in order to cope with peak business requirements, a big organization often owns a large number of IT assets that can be partially idle during non-peak periods; (iii) these unused assets are a loss for many organizations, because while they cannot produce business value, the total cost of ownership (TCO) of these unused systems is an expense the organizations cannot avoid; (iv) even in the cloud-computing era, many organizations still prefer owning their own private clouds to achieve security, quality, and reliability; and/or (v) whenever an organization uses, owns, or otherwise exclusively provisions a fixed quantity of their own systems, utilization can still be a big issue.

Further, some embodiments of the present invention recognize the following facts, potential problems and/or potential areas for improvement with respect to the current state of the art: (i) in an era of a service-oriented world, the service provider can be in situations of high volumes of service requests at peak time; (ii) if the demanding volume surpasses provider capability, the service providers must resort to other external resources to maintain the appropriate service response time; (iii) one possible solution is based on the traditional cloud computing model, where service providers try to obtain extra storage and processor power from the cloud; (iv) a problem is whether it is cost-effective and reliable to ask for general resources from the present generation of the cloud; and/or (v) in the same scenario, the service requesters may require best response time while the original service provider may not be geographically close to the service requester and/or may not have plenty of resources as needed to provide quick service.

In contrast, some embodiments of the present invention include non-traditional pricing models and requirements for resources to be provided. With such pricing policies and requirements distinct from those of conventional cloud models, cheaper and more reliable resources are provided to end service consumers. In some cases, this is done using special, dynamic agreements between idle resource providers and a service registry to achieve better prices for end consumers.

In recognition of the above, some embodiments of the present invention may include one or more of the following features, characteristics and/or advantages: (i) enable service delegation through a service registry; (ii) allow a service provider to publish information about delegating its services in a service registry; (iii) allow organizations with idle IT assets to request to delegate other service providers' services; and/or (iv) include a service registry that can approve and support the delegation, which may in some embodiments include providing the billing service for some or all parties. Some embodiments of the present invention: (i) solve the above-stated problems; (ii) provide the solution to several problems in a cost-effective, one-stop manner; (iii) may be incorporated in a future generation of cloud computing; and/or (iv) provide an easy-to-implement approach.

Some embodiments of the present invention recognize that in the current service-oriented world, three categories of participants are: (i) service provider (SP); (ii) service consumer (SC); and (iii) service registry (SR). Some embodiments of the present invention modify the traditional roles of these participants and/or include a fourth participant, referred to in this Sub-Section III as a secondary service provider (SSP), that makes use of its idle resources to undertake SP's work and provide SP's required service to SC. Each of these categories of participants, with respect to at least some embodiments of the present invention, will now be described in further detail.

Service Provider (SP): A service provider supplies services to a service requester. It registers its services in a service registry. At peak times, for example when an SP's CPU usage reaches a predefined threshold, it may tell the service registry to help delegate its services to other resource-rich parties.

Service Consumer (SC): A service consumer, or service requester, consumes services from a service provider.

Service Registry (SR): A service registry is a public (within a particular scope) trusted reference 'book' about who provides what services. The service registry may provide one or more of the following services: (i) acts as a "yellow book" for services; (ii) acts as a service delegation system; (iii) acts as a service trust verification system; and/or (iv) acts as a billing system. It may also provide one or more of the following services: (i) discovers status of SPs; (ii) responds to active requests from SSPs; (iii) detects potential SSPs automatically; (iv) matches requests from SPs and SSPs; (v) supports the deployment of services to SSPs; (vi) verifies the trust relationship between SPs and SSPs; and/or (vii) supports the billing between SPs, SCs, and SSPs.

Secondary service provider (SSP): A secondary service provider is an entity that has idle resources and is willing to utilize them to provide services delegated by the original SP for a given SC/SP relationship. It can be any entity known and approved by the service registry, and can come from any organization or resource provider. An SSP may primarily serve in the role of self-service entity (SSE) (using its computing resources for its own computing needs), service consumer/requester (requesting computing resources from others), and/or service provider (providing idle computing resources for use by others), and may fluidly switch among these roles at different times and/or for different services.

Some embodiments of the present invention may thus include one or more of the following features, characteristics and/or advantages: (i) through the service registry, an SP can improve quality of service by dynamically introducing new SPs (that is, SSPs) according to workload; (ii) different locations of new SPs can get shorter response times for nearby SCs; (iii) SSPs can better utilize their own resources and/or earn more money from their idle resources; and/or (iv) a new business model can be utilized based on the idea that SPs, SCs, one or more service registries, and SSPs can all benefit economically. For example, as a complement to cloud computing, there may be times of peak service in one private cloud while there are simultaneously idle resources in another private cloud.

Some embodiments of the present invention therefore provide a way to link such private clouds. That is, when private cloud resources are idle, they can be exposed to a service registry to be used for new services. The idle resources of a private cloud are not generally exposed to public cloud for arbitrary use. The idle resource owner trusts the service registry for the safe and limited use of its resources within specified parameters. For example, exposure of the idle resources can be achieved via the Internet with the arrangement of the service registry.

Figure 7A:
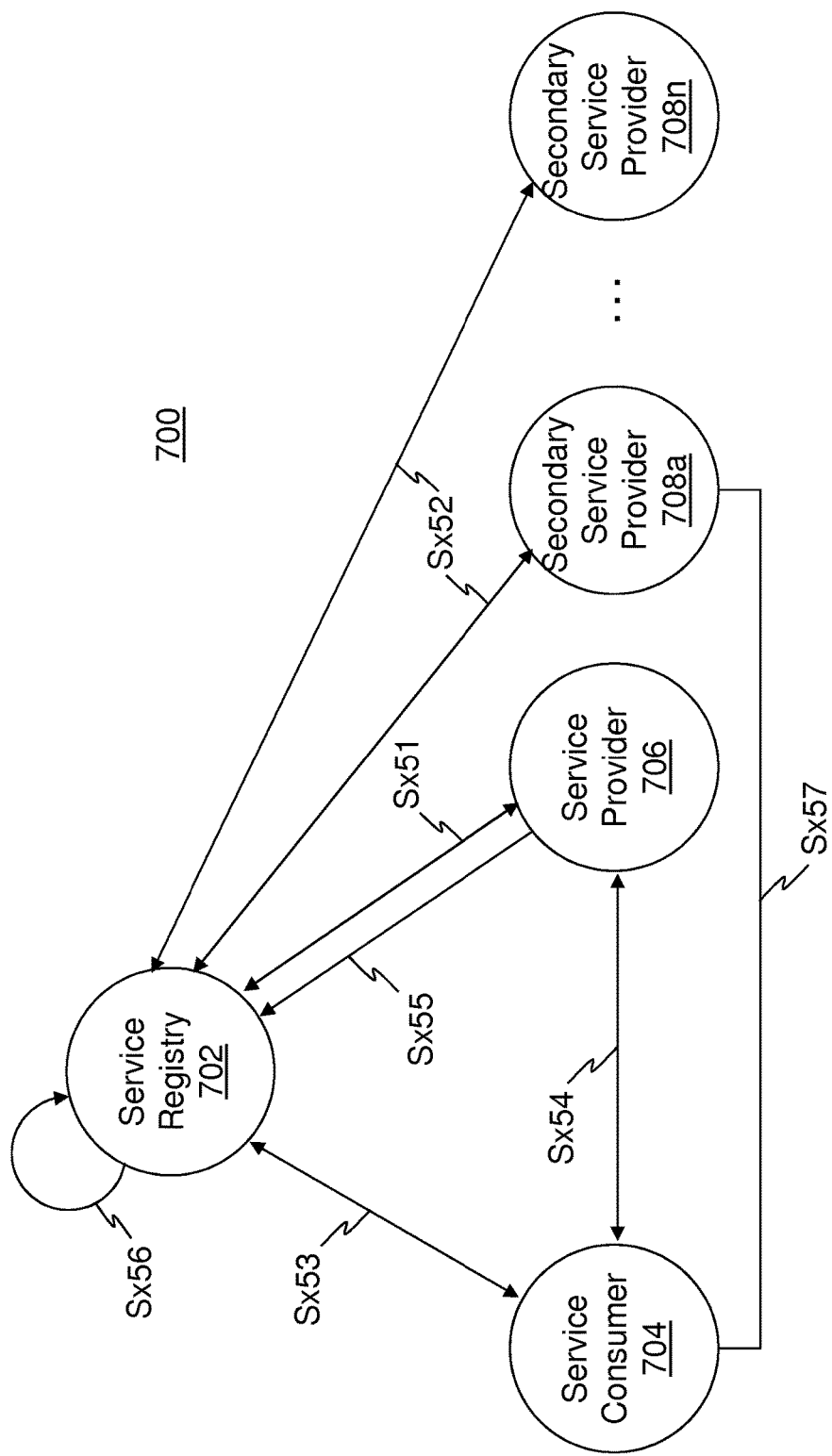
FIG. 7A is a block diagram of a second embodiment system according to the present invention.
Figure 7B:
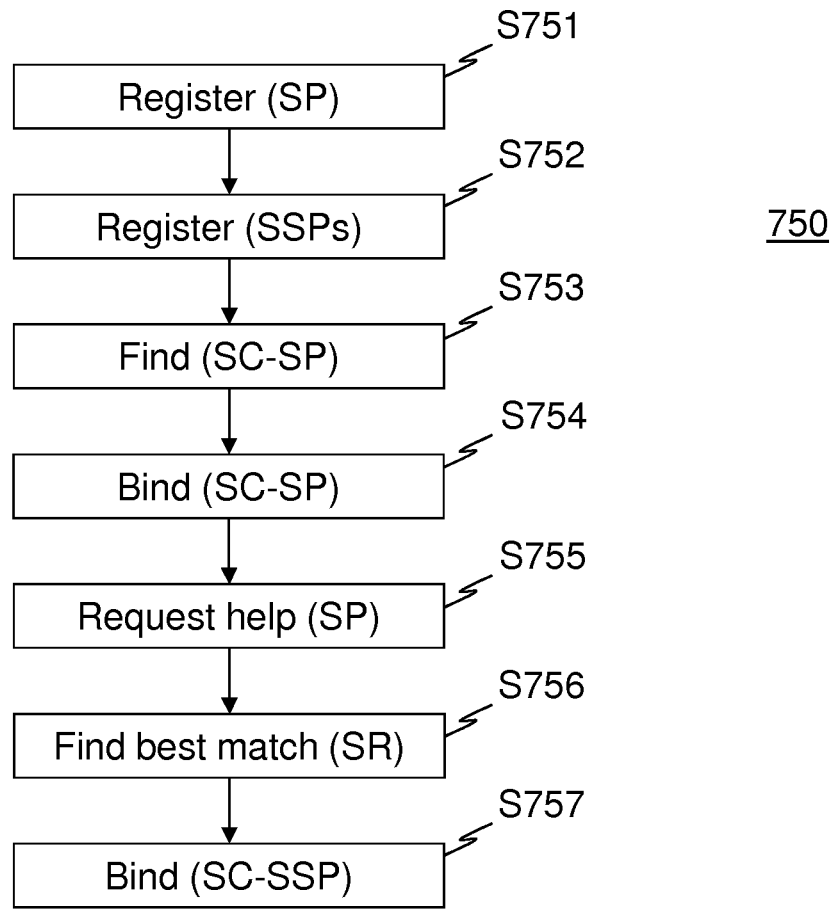
FIG. 7B is a flowchart showing a fourth embodiment method performed, at least in part, by the second embodiment system.

A typical scenario of an example embodiment of the present invention is presented in diagram 700 and flowchart 750 of FIGS. 7A and 7B, respectively. Diagram 700 includes: service registry (SR) 702; service consumer (SC) 704; service provider (SP) 706 (P$_1$); and secondary service providers (SSPs) 708a (P$_2$) through 708n (P$_{n+1}$). Flowchart 750 presents a series of interactions that occur between the various components of diagram 700 (interactions are also labeled in FIG. 7A for ease of reference). Although flowchart 750 presents the interactions in a serial fashion, it is to be understood that the process described is dynamic in nature, with SSPs in particular registering and de-registering available resources in an on-going fashion, and SPs requesting and withdrawing requests for help as their workloads require.

Processing begins at step S751, where SP 706 registers its services in SR 702. Processing proceeds to step S752, where SSPs 708a through 708n register "I have resources" requests (announcements) in SR 702. The "resources" data includes information about available platform capacity, such as what kinds of software services are available. An example request is shown in Table 1A. Information appended to the announcement by SR 702 is shown in Table 1B. (Note: the term(s) "J2EE" and/or "JVM" may be subject to trademark rights in various jurisdictions throughout the world and are used here only in reference to the products or services properly denominated by the marks to the extent that such trademark rights may exist.)

TABLE 1A

"Resources available" announcement by an SSP

```
<request type="Free resource" id="SR001">
<Capability id= 001 name="Capability" description=" ">
<resource type="J2EE platform" value="XYZ application server 8.5"/>
<resource type="JVM" value=""/>
<resource type="database services" value="ABC DBMS v10"/>
. . .
</Capability>
<endpoint url="http://www.domain.tld/path" port="xxxxx"/>
</request>
```

TABLE 1B

SR appendage to "Resources available" announcement

```
<!--- add by Service Registry ---!>
<reference credit=""/>
<reference security=""/>
<reference Deployed services=""/>
```

An idle resource provider such as SSP 708a may or may not tell the service registry what kinds of software services it has available. For instance, a software service may need other software services, so it could be valuable for the registry to know that some such services are already available. In this way, the idle resource provider might tell the service registry: "Please let me provide consumers some new services" with any new services being able to invoke declared existing services for convenience. For example, imagine a database company wanting to temporarily provide their idle resources. Such a company can tell the service registry "Our servers already have database system XYZ installed, and new services can use the database XYZ service with no additional charge or with a special discount." Such an approach may be most cost efficient than the general cloud (of course, it should also comply with all relevant legal restrictions such as software license terms). The idle resource provider may not know what new services will be provided before the service registry makes the decision, but it may volunteer to report services already available.

Processing proceeds to step S753, where SC 704 finds SP 706 from SR 702. In this embodiment, SP 706 is a commercial service provider whose computing resources are maintained principally for the purpose of serving service requesters. In other embodiments, SP may be, for example, an SSE. In step S754, SC 704 binds to SP 706 to begin the provisioning and utilization of SP 706's computing services.

Processing proceeds to step S755, where, when SP 706 is in peak time or is otherwise unable to handle its computing load, it sends an "I need help" request to service registry 702. An example request is shown in Table 2.

TABLE 2

SP "I need help" request

```
<request type="Need resource" id="SP001">
<requirement id= 001 name="urgency" description=" " value="high"
Required="Yes"/>
<requirement id= 002 name="capability" description=" "
Required="Yes">
<resource type="database services" value="ABC DBMS v10"/>
<resource type="J2EE platform" value="XYZ application server 8.5"/>
. . .
</requirement>
<requirement id= 003 name="services quality criterion" "
```

TABLE 2-continued

SP "I need help" request

```
Required="Yes">
<services name="throughput" value=">=300tps"/>
<services name="response time" value="<=3s"/>
</requirement>
<requirement id= 004 name="security" description=" " value=""
Required="No" Weight="3"/>
<requirement id= 005 name="credit" description=" " value=""
Required="No" Weight="1"/>
 . . .
</request>
```

In this embodiment, SP 706 sends the "I need help" request when average response time over the past five requests exceeds five seconds. More generally, SPs may send such requests based on any predefined threshold rules or values, for example based on monitored service data such as service average response time or number of concurrent requests. Furthermore, the request may reflect service urgency through the setting of different threshold values. For example, a threshold value of 1 indicates the urgency is minor; when threshold value reaches 5, the urgency is high. The SP can tell the service registry its urgency level, which the service registry can then use to find the best-matched new provider accordingly and/or to differ the pricing according to service needs.

Processing proceeds to step S756, where, upon receiving an "I need help" request, SR 702 establishes a best-match pair and delegates the requested services to the best-matched SSP. SR 702 maintains one pool for the potential SSPs and another pool for SPs that need help. It then uses these pools to find a well-matched SSP for the SP making the request, carefully considering any of a number of various factors, such as service urgency, service quality requirements, and/or service security requirements. For example, if the service help request is at a high level of urgency, the quicker the better. Deployment cost may also be a factor. SR 702 also matches the basic capacity between the SSP and the SP. It therefore checks if the required software components are matched and, once an SSP is placed in the matched-resource list with respect to the SP's help request, the service registry will testify to the SSP's throughput and response time via test applications. The goal is for the SSP to satisfy the service quality criterion requirement in the SP's "I need help" request. SR 702 may also consider other "non-required" factors with different weights. For example, if a service request includes an optional request for strict security control, security level will be considered with a high weight. Finally, the SSP commits how long its resources will be available. In general, this can help SR 702 to find the best matched pair. If the SSP cannot make a commitment, SR 702 reduces that SSP's credit level.

In this example, SR 702 determines that SSP 708*a* is the best match for SP 706's help request. Therefore, service delegation occurs and, in step S757, new requests from SC 704 are bound to SSP 708*a*. As both the SSP's "available" time and SP's peak usage time may be dynamically changing, SR 702 will monitor the pair during service delegation and, based on monitoring data, will predict if more providers will be required or if alternatively the service delegation can be withdrawn.

Figure 8:
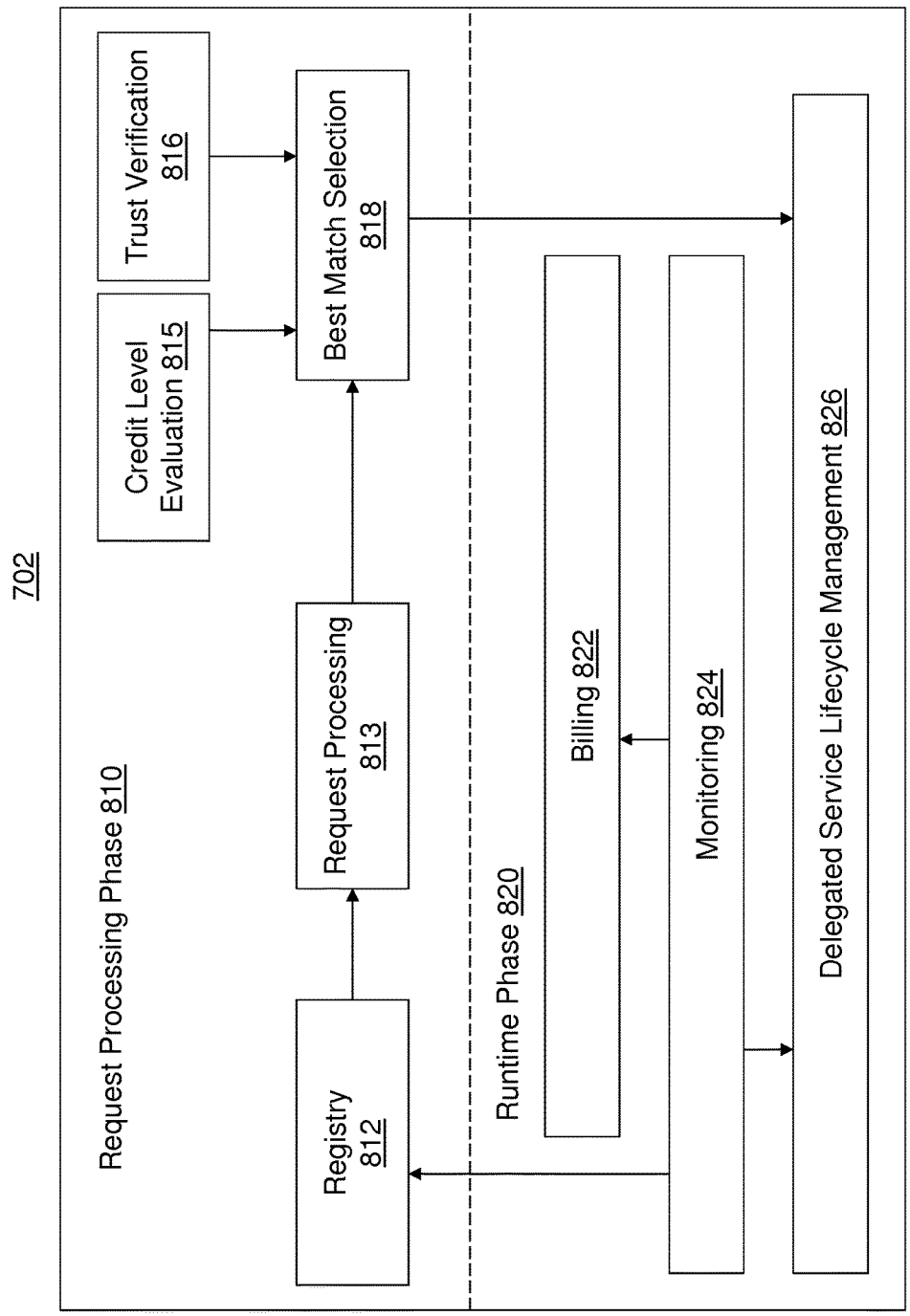
FIG. 8 is a block diagram showing a machine logic portion of the second embodiment system.

Shown in FIG. 8 is a more detailed view of SR 702, illustrating the architecture and modules in the service registry with respect to their use throughout the service delegation lifecycle. This diagram of SR 702 is divided by service delegation lifecycle phase into request processing phase 810 and runtime phase 820. Request processing phase 810 includes the following modules: registry 812; request processing 813; credit level evaluation 815; trust verification 816; and best match selection 818. Runtime phase 820 includes the following modules: billing 822; monitoring 824; and delegated service lifecycle management 826.

In request processing phase 810, registry 812 registers idle resources from SSPs as well as help requests from SPs. Request processing 813 maintains the idle resources pool and help requests pool from the two types of request data processed by registry 812. Best match selection 818 selects best matched pairs between these two pools, based on factors such as service urgency, capability, security, and credit level requirements.

In runtime phase 820, billing 822 supports the billing between SPs and SSPs (here, between SP 706 and SSP 708*a*—see FIG. 7A), and here uses monitoring data processed by monitoring 824. In general, any billing model may be used. Charges may be, for example, one-time per engagement, or may be recurrent over time as resource usage accumulates. The service requirement (urgency level, utilized resources, and so on) and the provided service quality may affect the price.

Lifecycle management 826 is responsible for deploying and withdrawing the delegated service. It also maintains deployment history data. Deploying the service into SSP 708*a* may include application deployment and/or server data deployment. To protect data privacy and/or integrity, only readable data (that is, data that is allowed to be read out from the original service provider and duplicated to the idle resource provider along with the service application) may be duplicated into the SSP. However, if the data is confidential or if there are many non-deployed services that rely on the client data, the delegated service may access the data in original SP 706 rather than receive its own copy through data deployment.

If SP 706 no longer needs additional help or if SSP 708*a* no longer has the ability to provide the requested help, SR 702 will ask to withdraw the service from SSP 708*a* and will delete its deployment bundle. However, if permitted by SP 706, the bundle may still exist in SSP 708*a* for a while so that if SP 706 again needs help, SSP 708*a* can quickly pick up the request.

Monitoring 824 has several monitoring functions. It monitors delegated service quality and provides feedback to the billing system and the credit level evaluation system. It also monitors both the original service and the delegated service, asking for more resources or communicating with lifecycle management 826 to withdraw the services as circumstances may require. Monitoring 824 may also automatically detect busy SPs and free resources of known SSPs, automatically (preemptively) registering these requests through registry 812.

Credit level evaluation 815 maintains the credit level of SSP 708*a* based on that SSP's commitment and the services quality it provided. If SSP 708*a* cannot meet its commitment, this will affect its credit level. On the other hand, if SSP 708*a* succeeds in meeting or exceeding its service commitment, its credit level will be high. After every services delegation, the original provider may also give feedback that affects the SSP's credit level. The credit level is a factor when best match selection 818 selects an SSP for future deployments.

Finally, trust verification 816 establishes and verifies the trust relationship between SP 706 and SSP 708*a*. SR 702 maintains a glue list (the trusted list) and a black list (the untrusted list) for each SP according to history data and/or specified preferences. If a trust relationship exists and has not expired, the registry can quickly deploy the requested service to the SSP's platform without the cost and overhead otherwise needed for identity verification.

Some embodiments of the present invention may include one or more of the following features, characteristics and/or advantages: (i) a service broker for outsourcing and improving utilization; (ii) a mechanism and metadata module to allow a service provider to publish its available resources and/or to request delegation help when it reaches a high workload burden in peak time—service providers (delegators) notify a public broker about the needs of delegation and the delegation conditions, while resource-rich systems (to-be delegatees) notify the public broker about the availability of their resources and conditions of usage; (iii) an appliance and module designed and enabled in a service registry (broker) to automatically delegate the services of service providers to the best-matched resource providers—service consumers can then invoke the services from the resource provider (delegatee) instead of the initial service provider (delegator); and/or (iii) the broker can automatically charge service consumers for the services provided by the delegatee and credit both the delegator and delegatee.

Some embodiments of the present invention may include one or more of the following features, characteristics and/or advantages: (i) allow service providers some input as into a work management scheduler decision-making mechanism; (ii) allow a 'delegate' service provider to register with a work management scheduler, not simply as "available for work," but as "available only if service provider 'X' is overloaded," giving the scheduler extra information and allowing it to call provider 'X' and only look at other options if provider 'X' fails; (iii) allow a service provider to influence a scheduler by telling the scheduler that it cannot handle a request, supplying a trigger upon which delegate service providers become normal service providers; (iv) allow a service provider to influence a scheduler by telling the scheduler that it is now available again, supplying a trigger upon which the delegate service providers can be gracefully retired in favor of the original provider; (v) allow an original service provider to specify the policies of selecting a 'delegate' service provider, which can be useful for maintaining quality of service, security, and other characteristics which may be promised by the original service provider; (vi) allow an original service provider to influence scheduler rules; and/or (vii) provide an infrastructure for payment for services provided to be correctly routed, creating the technological basis of a new form of commercial agreement between service providers.

Some embodiments of the present invention recognize that the complete openness of a system such as an open volunteer system where anyone can join is not necessarily appropriate for web service providing. For instance, a service consumer, may demand assurances that a service provider will provide a certain quality of service or will not intentionally compromise security or misuse data. Therefore, in some embodiments of the present invention, the service registry provides trust verification of SSPs.

Some embodiments of the present invention recognize that in conventional delegation approaches, the one who delegates the work doesn't know when the work will be done, and doesn't expect it to be done with a service-level agreement (SLA), but that this lack of service quality guarantees is not desirable in all circumstances. Therefore, in some embodiments of the present invention, SSPs (to-be delegatees) register to a service registry to announce "I am available now" first before getting any work assignment, and the service registry then chooses a best SSP to ensure an SLA for the delegating service provider.

Some embodiments of the present invention may include one or more of the following features, characteristics and/or advantages: (i) an SSP can take delegated work assignments when it is idle and/or can claim the condition(s) to end the delegation; (ii) an SSP is not completely controlled by either a service registry or the delegating service provider (the one who delegates work); (iii) an SSP can reclaim its resources when its own organization's internal demand for the resources goes up; and/or (iv) an SSP can specify some termination protocol at the time of initial registration in a service registry. Adhering to good etiquette for terminating a delegation may translate into good service quality and may increase the opportunity of an SSP being chosen by the service registry.

Some embodiments of the present invention may include one or more of the following features, characteristics and/or advantages: (i) prior to the routing of work to SSPs, use a service registry to supply the installation packages to support SSPs to provision a new service; (ii) prior to the routing of work to SSPs, use a service registry to act as a repository to store installation package so that there are no extra requirements for the original service provider to send out a provisioning package each time for a new contractor (delegatee); (iii) after successful routing and service consumption, use a service registry to credit and/or debit the various parties involved, including: (a) the service consumer, (b) the SSP, and/or (c) the original service provider. For instance, the SSP may be owed money for providing its resources; the original service provider may also be owed money, say, for licenses; and the service registry may levy a commission fee for delivering support to the other three parties (SC, SP, and SSP). Such coordination among SCs, SPs, and SSPs (including SSEs) may open the door to a new type of cloud ecosystem.

Some embodiments of the present invention may include one or more of the following features, characteristics and/or advantages: (i) a consolidated service registry such that there are no extra complicated requirements on normal service providers, service consumers, and SSPs; (ii) a service registry with powerful and integrated functionality; (iii) a mechanism and metadata module to allow a service provider (delegator) to submit some delegation info and expected SLA levels to a service registry when the service provider reaches a certain state, such as a high workload burden at peak times; (iv) a mechanism and metadata module to allow an SSP (to-be delegatee) to register resource availability, the conditions of usage, and/or the protocol used for terminating the delegation; (v) a service registry that uses a best-match strategy to select SSPs based on factors such as the SSPs' originally submitted metadata (available resources) and/or the consideration of the runtime states of the SSPs by dynamically analyzing their long run patterns using runtime data collection; and/or (vi) a service registry that provides an integrated billing mechanism for payments from the consumer to be automatically allocated between the original service provider and the SSP.

Some embodiments of the present invention may include one or more of the following features, characteristics and/or advantages: (i) apply to general service resource allocation, including but not necessarily limited to cloud computing; (ii) require prospective low-layer resource providers to be dynamically registered; (iii) have resource provider information sent to the registry that doesn't include services information because the registry decides later what services will be provisioned on and provided by the resource providers; (iv) allow resource providers to provide various services decided by the registry with due consideration of the providers' capabilities; (v) permit resource providers to gain better resource utilization through a model, such as in (iii) or (iv), that broadens the sorts of services providers can flexibly supply; (vi) allow a service provider to supply service using the resources of another resource provider via the help of a service registry, but without the direct involvement of the original service provider; (vii) benefit a resource provider by allowing it to utilize its otherwise idle resources; and/or (viii) improve service availability for the overall system.

Some embodiments of the present invention may include one or more of the following features, characteristics and/or advantages: (i) provide a platform to find an appropriate provider resource for a service consumer; (ii) treat each service consumer carefully and without competition among different service consumers; (iii) calculate the prices consumers need to pay using predetermined rates, allowing budget plans to be easily made by consumers; (iv) assure consumers with mission-critical scenarios of service resources if there are any available resources in the whole system; (v) distribute the benefits equitably among service consumers, original service providers, service resource providers, and the service repository; (vi) provide a simple, reliable, and easy-to-implement solution; (vii) provide short user response times (quick response times to system users, such as for provisioning resources); and/or (viii) allow system participants role flexibility—for instance, a service consumer could also turn into a service provider if it has enough resources to support a particular service; with abundant resources, a resource consumer can not only provide self-supply but can also supply services to other service consumers, permitting not only cost effective resource utilization but also potentially turning those extra resources directly into profit.

Recognizing: (i) that competent service providers know better about their service details than outside users and can suggest reasonable resource plans to balance both service quality and cost; (ii) that service providers can adjust resource criteria by self-test, analysis of outside usage, and/or other effective investigative approaches; (iii) that normal application developers prefer simple knowledge and easy practice of invoking services, and may not have the deep knowledge (such as service-level agreement information and/or the insight of the specific service performance required); and/or (iv) that if they ask for too much knowledge and effort from outside developers, service providers will lose users and business, some embodiments of the present invention allow the original service providers to provide to a registry the resource criteria used for making a provisioning decision. In such embodiments, there is no need for requesters' knowledge and practice, though users may also be permitted to suggest their preferred criteria.

Some embodiments of the present invention: (i) recognize that the selection of a resource provider is important; (ii) recognize that users often wish to pursue the lowest price from service providers; (iii) recognize that if users are randomly connected to resource providers, application developers or others may sometimes need to pay bills at high price points; (iv) allow selection among the available resource providers to get the best deal for requesters; (v) benefit users by allowing them to get a decent low price with the basic setting of the selection criteria; (vi) provide multiple benefits to the overall service ecosystem by taking good care of service users; (vii) allow resource providers to register with a service registry; (viii) use idle resources to get the best deal for consumers; and/or (ix) increase the utilization of idle resources.

Some embodiments of the present invention: (i) enable a service registry to do resource selection; (ii) enable a service registry to direct a new service instance provisioning; (iii) allow every original service provider to send their service programs and configuration data to a service registry; (iv) enable all additional runtime management work to be done by the service registry; (v) minimize overall system complexity and costs for service providers by placing resource selection and service provisioning tasks only on the service registry without every service provider needing to implement and/or deploy complicated resource allocation and service provisioning features; (vi) minimize migration scope, costs, and/or efforts by consolidating most system features in the service registry; (vii) use SSPs/idle resource providers to boost service ecosystem economy; (viii) allow parties with idle resource to supply help to other service providers just by registering on a central service registry, even when the idle-resource providers are only known by the service registry; (ix) involve off-loading of computer web service or Application Program Interface (API) services; (x) include service processing that is electronic and automatic; and/or (xi) include service providers that are organizations that run programs responding to invocations by other remote programs.

Some embodiments of the present invention: (i) are based on a service registry; (ii) include advanced framework to enable a resource market to achieve multiple benefits; (iii) supply flexibility through a service broker that can specify what kind of service a provider will supply; (iv) improve resource utilization by allowing a provider to supply services other than those it offers natively; (v) allow resource providers to only specify the generic resources for any services; (vi) include a registry that determines what service a resource provider will supply; (vii) include a registry that directs the provisioning of specific services on the resources providers; (viii) benefit both resource providers and service requesters by: (a) maximizing resource provider utilization, and/or (b) maximize the availability of any services in runtime; and/or (ix) employ a model where resources may include physical resources, databases, and/or virtual machines.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Delegator: as used herein, includes entities who: (i) have a need to delegate a service workload, but have not yet actually done so; and (ii) have actually delegated a service workload.

Delegatee: as used herein, includes entities who: (i) have a service providing capability, but have not yet actually been delegated a service workload; and (ii) have actually been delegated a service workload.

What is claimed is:

1. A computer program product (CPP) comprising:
a storage medium; and
computer code stored on the storage medium, with the computer code including instructions and data for causing a processor(s) set to perform at least the following operations:
receiving a plurality of service providers, with each given service provider of the plurality of service providers being a commercial entity capable of performing a first workload,
registering, by a work management scheduler, the plurality of service providers into a delegation management service registry by storing first registration data associated with each service provider of the plurality of service providers, with the plurality of service providers including a first service provider, and with registration data of the first service provider including information indicative of a registration status such that the first service provider is available to perform a delegated workload only if an overload condition exists,
determining, by machine logic of the work management scheduler, that an overload condition exists in the first service provider by consulting the first registration data of the first service provider stored in the delegation management service registry,
responsive to the determination that an overload condition exists, receiving, from a second service provider of a plurality of service providers and the work management scheduler, a first overload message including information indicating that an overload condition exists at the second service provider, and
responsive to receipt of the first overload message, delegating, by the machine logic of the work management scheduler, at least a portion of the first workload from the second service provider to the first service provider;
wherein the delegation of the at least the portion of the first workload through the use of the delegation management service registry improves the quality of service provided by the plurality of service providers by introducing alternative service providers to handle the first workload based, at least in part, upon the alternative service providers' availability to handle the first workload.

2. The CPP of claim 1 wherein the overload condition is unavailability of any other service provider of a plurality of service providers registered with the work management scheduler.

3. The CPP of claim 1 wherein:
the overload condition is unavailability of one or more service provider(s) of a set of designated service provider(s) of a plurality of service providers registered with the work management scheduler; and
the set of designated service provider(s) includes the second service provider.

4. The CPP of claim 1 wherein the computer code further includes instructions and data for causing the processor(s) set to perform the following further operation(s):
subsequent to the delegation of the at least a portion of the first workload, receiving, from the second service provider and by the work management scheduler, an overload-over message including information indicating that an overload condition no longer exists at the second service provider; and
stopping, by machine logic of the work management scheduler, the delegation of the at least a portion of the first workload from the second service provider to the first service provider.

5. The CPP of claim 1 wherein the computer code further includes instructions and data for causing the processor(s) set to perform the following further operation(s):
receiving, from second service provider and by the work management scheduler, a policy message including information indicative of a first policy under which delegations may be made from the second service provider to other service providers; and prior to delegating the at least a portion of the first workload, determining, by the work management scheduler, that the first policy would be met if the at least a portion of the first workload is delegated to the first service provider.

6. The CPP of claim 5 wherein the first policy relates to quality of service.

7. The CPP of claim 5 wherein the first policy relates to security.

8. A computer system comprising:
a processor(s) set;
a storage medium; and
computer code stored on the storage medium, with the computer code including instructions and data for causing the processor(s) set to perform at least the following operations:
receiving a plurality of service providers, with each given service provider of the plurality of service providers being a commercial entity capable of performing a first workload,
registering, by a work management scheduler, the plurality of service providers into a delegation management service registry by storing first registration data associated with each service provider of the plurality of service providers, with the plurality of service providers including a first service provider, and with registration data of the first service provider including information indicative of a registration status such that the first service provider is available to perform a delegated workload only if an overload condition exists,
determining, by machine logic of the work management scheduler, that an overload condition exists in the first service provider by consulting the first registration data of the first service provider stored in the delegation management service registry,
responsive to the determination that an overload condition exists, receiving, from a second service provider of a plurality of service providers and the work management scheduler, a first overload message including information indicating that an overload condition exists at the second service provider, and
responsive to receipt of the first overload message, delegating, by the machine logic of the work management scheduler, at least a portion of the first workload from the second service provider to the first service provider;
wherein the delegation of the at least the portion of the first workload through the use of the delegation management service registry improves the quality of service provided by the plurality of service providers by introducing alternative service providers to handle the first workload based, at least in part, upon the alternative service providers' availability to handle the first workload.

9. The system of claim 8 wherein the overload condition is unavailability of any other service provider of a plurality of service providers registered with the work management scheduler.

10. The system of claim 8 wherein:
the overload condition is unavailability of one or more service provider(s) of a set of designated service provider(s) of a plurality of service providers registered with the work management scheduler; and
the set of designated service provider(s) includes the second service provider.

11. The system of claim 8 wherein the computer code further includes instructions and data for causing the processor(s) set to perform the following further operation(s):
subsequent to the delegation of the at least a portion of the first workload, receiving, from the second service provider and by the work management scheduler, an overload-over message including information indicating that an overload condition no longer exists at the second service provider; and
stopping, by machine logic of the work management scheduler, the delegation of the at least a portion of the first workload from the second service provider to the first service provider.

12. The system of claim 8 wherein the computer code further includes instructions and data for causing the processor(s) set to perform the following further operation(s):
receiving, from second service provider and by the work management scheduler, a policy message including information indicative of a first policy under which delegations may be made from the second service provider to other service providers; and
prior to delegating the at least a portion of the first workload, determining, by the work management scheduler, that the first policy would be met if the at least a portion of the first workload is delegated to the first service provider.

13. The system of claim 12 wherein the first policy relates to quality of service.

14. The system of claim 12 wherein the first policy relates to security.

* * * * *